United States Patent

Chang et al.

[11] Patent Number: 5,712,327
[45] Date of Patent: Jan. 27, 1998

US005712327A

[54] SOFT GAS PERMEABLE CONTACT LENS HAVING IMPROVED CLINICAL PERFORMANCE

[76] Inventors: Sing-Hsiung Chang; Mei-Zyh Chang, both of 6 Buckskin Heights Dr., Danbury, Conn. 06811

[21] Appl. No.: 899,217

[22] Filed: Jun. 16, 1992

Related U.S. Application Data

[63] Continuation of Ser. No. 551,156, Jul. 11, 1990, which is a continuation-in-part of Ser. No. 407,261, Sep. 14, 1989, abandoned, Ser. No. 381,587, Jul. 18, 1989, abandoned, and Ser. No. 132,174, Dec. 14, 1987, abandoned, which is a continuation-in-part of Ser. No. 1,149, Jan. 7, 1987, abandoned.

[51] Int. Cl.$^6$ .............................. C08K 3/00; C08K 5/54; C08F 130/08; B29D 11/00

[52] U.S. Cl. ..................... 523/107; 264/1.1; 264/2.6; 351/160 R; 351/160 H; 427/2.24; 427/487; 427/496; 427/508; 427/515; 522/99; 524/424; 525/326.5; 525/342; 525/477

[58] Field of Search ............................. 523/106, 107; 264/2.6, 1.1; 351/160 R, 160 H; 427/2, 487, 496, 508, 515, 2.24; 524/424; 526/279, 282, 264; 522/99; 525/326.5, 342, 477

[56] References Cited

U.S. PATENT DOCUMENTS

| | | | |
|---|---|---|---|
| 3,937,680 | 2/1976 | Carle | 526/264 |
| 4,099,859 | 7/1978 | Merrill | 351/160 H |
| 4,139,513 | 2/1979 | Tanaka et al. | 526/279 |
| 4,158,089 | 6/1979 | Loshaek et al. | 526/264 |
| 4,260,725 | 4/1981 | Keogh et al. | 526/75 |
| 4,261,875 | 4/1981 | Le Boeuf | 526/279 |
| 4,343,927 | 8/1982 | Chang | 526/264 |
| 4,463,149 | 7/1984 | Ellis | 526/279 |
| 4,487,905 | 12/1984 | Mitchell | 526/279 |
| 4,550,001 | 10/1985 | Suminoe et al. | 526/486 |
| 4,582,884 | 4/1986 | Ratkowski | 526/279 |
| 4,711,943 | 12/1987 | Harvey | 526/279 |
| 4,734,475 | 3/1988 | Goldenberg et al. | 525/326.5 |
| 4,740,533 | 4/1988 | Su et al. | 523/106 |
| 4,769,431 | 9/1988 | Ratkowski | 526/279 |
| 4,780,510 | 10/1988 | Uemiya et al | 526/279 |
| 4,806,382 | 2/1989 | Goldberg et al. | 427/2.24 |
| 4,812,173 | 3/1989 | Tsao et al. | 134/27 |
| 4,861,840 | 8/1989 | Lim et al. | 525/326.5 |
| 4,892,402 | 1/1990 | Sawamoto et al. | 351/160 H |
| 4,920,184 | 4/1990 | Schafer et al. | 525/477 |
| 4,954,587 | 9/1990 | Mueller | 526/279 |
| 4,961,954 | 10/1990 | Goldberg et al. | 427/2.24 |

*Primary Examiner*—Herbert J. Lilling
*Attorney, Agent, or Firm*—William J. Speranza

[57] ABSTRACT

A hydrophilic soft gas permeable contact lens having substantially improved clinical performance by the provision of a sufficient higher proportion of hydroxy acrylic units to silicon units in the lens surface layer, as compared to that existing in the lens core, by the surface treatment of the lens, such as by reacting of the lens surface with polyols and base or acid or by radiation treatment of the base lens to graft, deposit or coat thereon hydroxy acrylic units.

14 Claims, No Drawings

5,712,327

SOFT GAS PERMEABLE CONTACT LENS HAVING IMPROVED CLINICAL PERFORMANCE

This is a continuation of application Ser. No. 07/551,156 filed on Jul. 11, 1990 which in turn is a continuation-in-part of prior applications, Ser. No. 07/407,261, filed Sep. 14, 1989 now abandoned; Ser. No. 07/132,174 filed Dec. 14, 1987 now abandoned (which in turn is a continuation-in-part of prior application Ser. No. 001,149, filed Jan. 7, 1987) now abandoned; and Ser. No. 07/381,587, filed Jul. 18, 1989 now abandoned.

BACKGROUND OF THE INVENTION

The present invention relates to contact lenses, and more particularly to hydrophilic soft gas permeable contact lenses having improved clinical performance.

Among the most important properties and requirements of contact lenses are substantial permeability to oxygen (commonly referred to as DK), and a highly wettable and deposition-resistant surface.

The development and use of plastic materials and compositions for contact lenses has been the subject of much attention over the years.

Among the first such developments was the so-called hard lens utilizing the hard plastic polymethylmethacrylate (PMMA). However, this material does not exhibit a significant degree of oxygen permeability and has very poor surface wettability characteristics. The art then progressed to soft lenses based upon poly 2-hydroxyethyl methacrylate (poly HEMA), a material having significantly better oxygen permeability and surface quality than the hard PMMA plastic. Nevertheless, these characteristics were still not as high as desirable or necessary, and lenses of this type often resulted in serious problems of corneal staining, swelling, ulcers, thickness and infection.

Somewhat more recently, based upon better understanding of the corneal requirement of substantial oxygen permeability, the art proposed the use of so-called hard gas permeable (HGP) lenses composed of either of two types of plastic materials, acrylic silicone or acrylic fluorosilicone. See, e.g., U.S. Pat. No. 3,808,178. Generally, the oxygen permeability of HGP lenses can progressively be increased with increasing amounts of the silicone and/or fluorosilicone in the composition; at the same time, however, the surface wettability of the lens becomes progressively poorer. In order to overcome this problem, it is known to incorporate a relatively large amount of methacrylic acid (MAA), an ionic material, into the formulation, resulting in the lens surface being negatively charged to a certain extent. While this expedient does lead to improved surface wettability, the negatively-charged surface has a very high absorptivity leading to serious deposition problems. As a consequence, the HGP lens is of only limited potential.

Most recently, hydrophilic soft gas permeable (SGP) lenses have been developed based upon compositions containing, e.g., a polymerizable vinylic siloxane monomer and a hydrophilic vinylic monomer. See, e.g., U.S. Pat. Nos. 4,136,250; 4,182,822; 4,261,875; 4,343,927; 4,426,389; 4,486,577; 4,605,712; 4,711,943 and 4,837,289. The SGP lenses of this type, which generally have a water content of from about 25 to 75% by weight, have excellent oxygen permeability and hydrophilicity. Surprisingly, however, the clinical performance of SGP lenses, including functional (i.e., on the eye) wettability, deposition resistance, dehydration resistance and/or comfort, is very poor, making such lenses unsuitable for extended wear.

Thus, notwithstanding the advances made to date, there still exists a need for plastic contact lenses of the SGP type which not only possess a high degree of oxygen permeability, but also exhibit excellent clinical performance, such as functional wettability, deposition resistance, and comfort, thus making the lenses suitable for extended wear. The foregoing is the principal object of the invention.

SUMMARY OF THE INVENTION

This and other objects are achieved in the present invention by the provision of a soft gas permeable contact lens, composed of the polymerization product of compositions containing a polymerizable vinylic siloxane monomer and a hydrophilic vinylic monomer, having on the lens surface a proportion of hydroxy acrylic monomer units to silicon units sufficient to provide an SGP lens having the requisite high DK, softness and rebound elasticity, and which at the same time possess a high degree of clinical performance, thus rendering the lenses eminently suitable for long-term extended wear.

The requisite sufficient proportion of hydroxy acrylic monomer units to silicon units on the lens surface can be attained by surface treatment of the lens in order to increase hydroxy acrylic monomer units and/or to reduce the silicon units on the surface. In preferred embodiments of the invention, the surface treatment is carried out either by reaction on the lens surface with a polyhydric alcohol (polyol) and/or base or acid, or by radiation treatment of the lens to graft, deposit or coat hydroxy acrylic monomer units on the surface thereof.

It should be noted that the present invention differs significantly from prior art practices related to the provision, or attempted provision, of a hydrophilic surface on a hydrophobic lens. Thus, hydrophobic lenses are known in the art which are made of silicone rubber, a cross-linked polysiloxane, such as illustrated in U.S. Pat. No. 3,228,741. These hydrophobic lenses are highly oxygen permeable but are extremely poor in functional wettability, deposition resistance and comfort, and also exhibit a mysterious tight lens syndrome. It is known in the art to seek to improve the functional wettability of such lenses by provision of an ultrathin coating of hydrophilic polymer. See, e.g., U.S. Pat. Nos. 3,854,982; 3,916,033; 3,925,178; and 4,143,949. Generally these efforts have not in any event proven successful. One reason is because the silicone rubber lens is rather rigid, and as a consequence an ultrathin (i.e., Angstoms level) hydrophilic coating is easily rubbed away during routine cleaning cycles, with the result that the lens soon re-exhibits the poor wettability, poor deposition resistance, discomfort and tight lens syndrome characteristic of silicone rubber hydrophobic lenses. Provision of thicker layers of hydrophilic polymer on the lens to resist rubbing off is impractical, since oxygen permeability of the lens is substantially reduced and since the differences between the refractive index of the silicone rubber and the thick hydrophilic polymer coating become such as to result in a highly undesirable lens.

In the present invention, the lens per se is a hydrophilic SGP lens containing a substantial amount of water (e.g., generally at least 25% by weight) such that its surface, in contrast to the silicone rubber lenses, is already highly hydrophilic and no apparent need would exist to provide a hydrophilic polymeric surface coating thereon as is taught with respect to hydrophobic lens materials. In the present invention, it has surprisingly been found that the SGP lenses, even though having highly hydrophilic surfaces, nevertheless can still be very poor in clinical performance, and that this problem can be overcome by providing on the surface of the SGP lens a ratio of hydroxy acrylic units to silicon units which is sufficient to bring about significant clinical improvement.

Also in contrast with the treatment of hydrophobic silicone rubber lenses, it is found that the criteria employed in improving wettability of those lenses by hydrophilic monomer coatings is not correlatable to bringing about improved clinical performance in the hydrophilic SGP lenses to which the present invention is directed. For example, for hydrophobic lenses, acceptable wettability has been determined based upon contact angle (see, e.g., Col. 7, lines 13–16, of U.S. Pat. No. 4,143,949), resulting in findings that coatings based upon amide monomers (e.g., N-vinylpyrrolidone) are quite effective in improving wettability (see, e.g., Example 1–2 of the above patent). In contrast, however, in the context of the hydrophilic SGP lenses of the present invention and particular those of preferred center thickness of from 0.05 to 0.08 mm, such amide group-containing monomers are quite ineffective in improving the clinical performance of the SGP lenses.

Accordingly, the findings and techniques of the present invention would not have been derivable or predictable from the known practices regarding improving the wettability of hydrophobic silicone rubber lenses.

DETAILED DESCRIPTION OF THE INVENTION

The basic teachings and formulations and techniques regarding formation of silicone-based SGP lenses are known in the art, as reflected in the earlier-mentioned patents, the disclosures of which are expressly incorporated herein by reference. The SGP lens is formed from the polymerization product of compositions containing at least one polymerizable vinylic siloxane (PVS) monomer, and at least one hydrophilic vinylic monomer. The polymerizable vinylic siloxane monomer contains at least one polymerizable vinylic group such as acrylic, styrenyl or vinylic group, at least one polysiloxanyl group, and at least one linkage connecting these two groups; thus, for example:

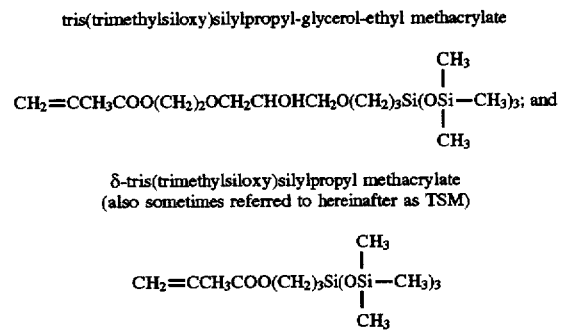

Hydrophilic vinylic monomers suitable for use in SGP lens compositions along with the PVS include, for example, N,N-dimethylacrylamide (NNDMA), 2-hydroxyethyl methacrylate (HEMA), glyceryl methacrylate (GMA), N-vinyl pyrrolidone and the like.

The lenses per se are formed by lathe cutting, cast molding, spin casting, or other like known techniques.

As earlier noted, SGP lenses made according to the known formulations possess a high oxygen permeability but exhibit poor clinical performance. In the present invention, it has been discovered that by increase of the proportion of hydroxy acrylic monomer (HAM) units, preferably HEMA and/or GMA units, to silicon units at the lens surface, the clinical performance can be substantially improved. As used herein, the units referred to are the structural monomeric units or the number of silicon atoms, including those as part of an overall copolymeric structure.

Hydroxy acrylic monomer (HAM) suitable for the practice of this invention correspond to the formula

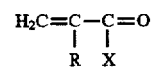

wherein R is H or a substituted or unsubstituted alkyl, such as methyl or $CH_2COOH$; and X is a radical selected from the group consisting of hydroxyalkyloxy, hydroxyalkyl amine, and hydroxy; with the alkyl being substituted or unsubstituted, and preferably selected from $C_1$ to $C_{10}$ alkyls, most preferably $C_2$ and $C_3$ alkyls; and with the hydroxy on the alkyl being either a single hydroxy (e.g., as in 2-hydroxyethyl methacrylate) or multiple hydroxy (e.g., as in glyceryl methacrylate). Exemplary and preferred hydroxy acrylic monomers are:

1. 2-hydroxyethyl acrylate or methacrylate;
2. glyceryl acrylate or methacrylate;
3. ethylene glycolato ethyl acrylate or methacrylate, i.e., $CH_2=CRCOO-CH_2-CH_2-O-CH_2-CH_2-OH$
4. glycerolglyceryl acrylate or methacrylate, i.e., $CH_2=CRCOO-CH_2CH(OH)-CH_2-O-CH_2-CH(OH)-CH_2-OH$
5. N-hydroxymethyl, N-methyl acrylamide or methacrylamide;
6. N-2-hydroxyethyl, N-methyl acrylamide or methacrylamide;
7. N-2,3-dihydroxypropyl, N-methyl acrylamide or methacrylamide;
8. acrylic acid, methacrylic acid or itaconic acid.

As noted, the SGP lens of the invention is made from the known SGP lens compositions and, after lens formation, the lens is then treated to provide on its surface a proportion of HAM units to silicon units (e.g., by increase of HAM units and/or by decrease of silicon units) sufficient to provide improved clinical performance of the lens, such as functional wettability, deposition resistance, dehydration resistance and comfort.

One means for achieving the requisite surface proportion of HAM to silicon units is by reaction of the lens surface, preferably in the dehydrated state, with a polyol of the formula $R_1(OH)_n$ where $R_1$ is a substituted or unsubstituted alkyl, preferably a $C_2$ to $C_5$ alkyl, and n is an integer of at least 2, such as glyceryl methacrylate, ethylene glycol, glycerine, glycerine-glycerine, polyglycerine, or the like. The reaction is preferably carried out in the presence of a base, such as sodium hydroxide, preferably in a concentration of 0.1 to 10 mole percent based on the polyol, or an acid or acid-containing mixture, such as ethanol/sulfuric acid, the reaction being conducted to the extent that the physical properties of the base lens (e.g., strength, oxygen permeability, softness, rebound elasticity, etc.) are essentially unaffected. This reaction is intended to increase the HAM units in the surface layer by transesterification and/or to reduce the silicon units by the cleavage of siloxane bonds catalyzed by base or acid.

Alternatively, the core lens can be treated with a HAM, preferably 2-hydroxyethyl acrylate or methacrylate, by grafting, deposition or coating to the lens surface so as to provide a sufficient proportion of HAM units to silicon units at the lens surface. The grafting, deposition or coating can be carried out using known radiation-induced reactions, including reactions induced by UV, x-ray, γ-ray, and other electromagnetic radiation, such as radio frequency, microwave and the like, electron beam radiation, including electrical discharge, and the like, with reactions induced by UV, γ-ray or electron beam radiation being preferred. The treating techniques per se that can be used in the practice of this invention are well known in the art, such as the grafting, deposition or coating cured by UV, γ-ray or electron beam, illustrated in U.S. Pat. Nos. 3,916,033 and 3,854,982; coating by spin casting or cast molding of the lenses cured by radiation; or plasma treating techniques, such as those disclosed in U.S. Pat. Nos. 3,925,178 and 4,143,949, as is well known in the art. The disclosures of these prior art patents are expressly incorporated herein by reference. In the preferred embodiment of the invention, the surface treatment produces on the lens surface a thin coating consisting essentially of poly(hydroxy alkyl acrylate and/or methacrylate), more preferably poly(2-hydroxyethyl acrylate and/or methacrylate).

The required sufficient proportion of HAM units to silicon units on the lens surface that produces the desirable clinical performance will vary primarily depending upon the type and amount of particular PVS and hydrophilic monomer employed. However, the sufficient proportion in the surface layer will, at any proportion, be higher than that existing in the lens body or core. Preferably, the proportion of HAM units to silicon units in the surface layer is at least 0.5. Generally, the higher the proportion the better the clinical performance of the lens, and the thicker the treated surface layer the better the durability of the lens wettability. However, the treated layer can not be so thick that the desired properties of the lens are adversely affected. The extent of acceptable surface treatment can be monitored by high resolution photoelectron spectroscopy (ESCA) or based on the clinical response as illustrated in the examples of this specification. Thus, based on the disclosure of this invention, the sufficient proportion of HAM units to silicon units on the lens surface can easily be determined by those skilled in the art.

Although not wishing to be bound by any theory as such, it is postulated that the improvement in the clinical performance of the lens comes about, at least in part, by virtue of establishment of compatibility between the delicate corneal wetting mechanism of the eye and the composition and structure of the lens surface. The known SGP lens having insufficient proportion of HAM units to silicon units or containing too high a level of silicon units on the surface are too hydrophobic for the spreading and binding of mucin to the lens surface. Mucin is the excellent wetting agent used in the cornea and contains a certain proportion of hydrophilic sites to hydrophobic sites. With increasing amount of HAM units on the lens surface, there are provided increased sites for hydrogen bonding with the hydrophilic sites on the mucin, while reduction of silicon surface units provides fewer hydrophobic sites and thus better spreading of mucin on the lens surface. As a consequence of the preferred embodiment of the invention herein, which results in the lens surface having a sufficient proportion of HAM units to silicon units, the lens surface becomes more closely matched to, and receptive to, tear mucin. As a result, the mucin can better spread on and bind to the lens surface so as to provide the improved clinical performance. Thus, when the wetting angle of the lens is controlled to that of the corneal surface free of mucin, the best results of this invention may result.

The invention is further illustrated with reference to the following examples.

EXAMPLE 1

SGP lenses were fabricated from buttons which were made according to the formulations and procedures set forth in U.S. Pat. No. 4,182,822, the starting formulation consisting of 36% (by weight), γ-tris(trimethylsiloxy) silylpropyl methacrylate (TSM) prepared according to Example 1 of the above patent, 59% N,N-dimethylacrylamide (NNDMA), and 5% methyl methacrylate (MMA) with 0.3% t-butylperoxypyvalate included as a catalyst. The formulation was placed in a Teflon tube. After deoxygenation by nitrogen for 15 minutes, the tube was sealed and the formulation was polymerized in a 40° C. water bath for six hours, followed by a 100° C. treatment for another six hours. The buttons cut from the rods were post-cured at 110° C. under high vacuum (0.5 Torr) for six hours.

The lens can be made by the lathe technique known in the art. The hydrated lenses were extracted and conditioned in physiological saline solution for a time sufficient to insure no substantial irritation.

The lens thus made has high DK, about 4 to 5 times higher than that of the conventional poly HEMA soft lens, and contains about 50% by weight of water, and thus has softness, rebound elasticity and a highly hydrophilic lens surface. The proportion HAM units to silicon units on the lens surface is equal to zero. Clinically, the lenses were very poor in performance such as functional wettability, deposition resistance and comfort, making the lens unsuitable for extended wear.

Provision of 6% by weight HEMA in the formulation, such that the formulation comprised 36% TSM, 58% NNDMA and 6% HEMA, results in a lens having high DK, softness, rebound elasticity, a highly hydrophilic surface and a proportion of HAM to silicon units equal to 0.15, and thus an improved SGP lens having improved clinical performance, such as functional wettability, deposition resistance and comfort as compared to the control lens above. Clinically, the lenses could be worn for up to several hours by test patients.

In the same manner, using 20% by weight HEMA, such that the lens formulation contains 36% TSM, 44% NNDMA and 20% HEMA, results in a lens having high DK, softness, rebound elasticity, a highly hydrophilic surface and a proportion of HAM units to silicon units equal to 0.5, and thus even more improved clinical performance, such as functional wettability, deposition resistance and comfort, as compared to the control lens. Clinically, the lenses could be worn continuously for up to several days by test patients, with wettability marginally unacceptable in certain circumstances.

Further increase of the HAM to silicon proportion by increase of the amount of HEMA in the composition is at the expense of TSM, and thus reduces the oxygen permeability of the lens and/or causes the formation of opaque material. As shown in the following examples, further increase of the HAM to silicon proportion can be achieved by surface treatment.

EXAMPLE 2

The lens containing 20% HEMA as made in Example 1, after being hydrated in physiological saline solution, is then extracted in isopropanol for 24 hours, followed by treatment in the dry state with glycerine (96% purity, Colgate Palmolive Co.) containing 1 mole % NaOH at 70° C. for 30 minutes by stirring. The strength of the lens after the treatment was not significantly affected. The resulting lens could be used for at least weekly extended wear by the test patients. The clinical of long term wearing on one patient showed that the lenses could indeed continuously be worn for up to 3 months for at least certain patients. Thus, the surface treatment resulted in substantially improved clinical performance.

EXAMPLE 3

A SGP lens comprising 47% (by weight) TSM, 45% NNDMA and 8% HEMA, having 38% water content, high DK, softness, highly hydrophilic lens surface and a proportion of HAM units to silicon units equal to about 0.15, was found to be unsuitable for extended wear. Clinically, the lens produced poor vision, discomfort and encountered serious deposition problems within less than four hours of wear. However, treatment of the same lens in dehydrated state by stirring the lens in a glycerine reagent (96% purity, Colgate Palmolive Co.) containing 10 mole % NaOH at 70° C. for 2 hours converted the lens to one which on the same patient could be used for weekly extended wear for a three week testing period with stable vision and no observable deposition, and demonstrated a liquid layer over the lens surface.

EXAMPLE 4

According to an independent surface study (about 100 A° surface layer) by photoelectron spectroscopy (ESCA) analysis of the lens after being treated as described in Example 3 showed that there was a reduction of about 18% silicon or about 30% siloxy group and an increase of overall carbon content from 62.5 to 65% in which the C in the CO group increased from 10.5 to 12.5% and the C in the COOR group increased from 5.3 to 6.3% after the treatment. The increase of CO and COOR content should indicate that the transesterification of glycerine occurs, i.e., the formation of glyceryl methacrylate. The reduction of silicon units and/or the increase of glyceryl methacrylate units after the treatment increases the proportion of HAM units to silicon units which provides the substantially improved clinical performance as described above. (Note: ESCA data is the average value of the treated surface with 100 A° depth. Thus, the value right at the surface is substantially higher than those reported above.)

EXAMPLE 5

An unhydrated optically polished lens button was made according to U.S. Pat. No. 4,182,822 employing 36% (by weight) TSM, 42% NNDMA and 22% HEMA, and glycerine surface treated as set forth in Example 3 herein. The button was fully hydrated in physiological saline solution, and its surface was subjected to a number of simulated cleaning cycles, each cycle involving thumb-rubbing 10 times in tap water, followed by wetting in physiological saline solution. The surface wettability to the physiological saline solution was substantially the same based on visual inspection after sixty (60) cleaning cycles, equivalent to about one years service life of the lens in weekly extended wear.

The surface of the untreated button was substantially not wettable by physiological saline solution under the same testing condition.

Although the invention has been described in connection with particular preferred embodiments, it is not intended to limit the invention to particular forms set forth, but on the contrary, it is intended to cover such alternatives, modifications and equivalents as may be included within the spirit and scope of the invention as defined by the appended claims.

What is claimed is:

1. A hydrophilic soft gas permeable contact lens comprised of a polymerization product of a composition comprising a polymerizable vinylic siloxane monomer and a hydrophilic vinylic monomer, and having at least 25% water by weight and characterized by high oxygen permeability, softness, rebound elasticity and a high degree of clinical performance, said lens comprising a hydrophilic lens body and a tear-wettable surface layer integral therewith, said lens body being comprised of said polymerization product and said tear-wettable surface layer being comprised of polymeric material containing hydroxy acrylic monomer units, and wherein the proportion of hydroxy acrylic monomer units to silicon units in said tear-wettable surface layer is greater than that of said lens body.

2. A contact lens according to claim 1 wherein said hydroxy acrylic monomer units are selected from the group consisting of hydroxyalkyl acrylate, hydroxyalkyl methacrylate, acrylic acid, methacrylic acid, and combinations thereof.

3. A contact lens according to claim 2 wherein said hydroxy acrylic monomer units are 2-hydroxyethyl methacrylate.

4. A contact lens according to claim 2 wherein said hydroxy acrylic monomer units are methacrylic acid.

5. A contact lens according to claim 1 wherein said hydroxy acrylic monomer units are itaconic acid.

6. A contact lens according to claim 1 wherein said polymerizable vinylic siloxane monomer is γ-tris (trimethylsiloxy)silylpropyl methacrylate, and wherein said hydrophilic vinylic monomer is N,N-dimethylacrylamide.

7. A method for making a hydrophilic soft gas permeable contact lens having improved clinical performance, said method comprising the steps of:

(a) forming a hydrophilic soft gas permeable contact lens body having at least 25% water by weight and comprised of a polymerization product of a composition comprising a polymerizable vinylic siloxane monomer and a hydrophilic vinylic monomer; and (b) reacting said lens body with a member selected from the group consisting of (i) a polyol of the formula $R_1(OH)_n$, wherein $R_1$ is a substituted or unsubstituted alkyl and n is an integer of at least 2, and (ii) hydroxy acrylic monomer, to provide on said lens body a surrounding tear-wettable surface layer integral therewith, said surface layer being comprised of polymeric material containing hydroacrylic monomer units, and wherein said tear-wettable surface layer has a proportion of hydroxy acrylic monomer units to silicon units greater than that of said lens body.

8. A method according to claim 7 wherein said hydroxy acrylic monomer units are selected from the group consisting of hydroxyalkyl acrylate, hydroxyalkyl methacrylate, acrylic acid, methacrylic acid, itaconic acid, and combinations thereof.

9. A method according to claim 7 wherein said polyol is selected from the group consisting of ethylene glycol, glycerine and mixtures thereof.

10. A method according to claim 7 wherein step (b) comprises reacting hydroxy acrylic monomer to said lens body by radiation-initiated reaction, to form said surface layer.

11. A method according to claim 10 wherein said radiation-initiated reaction utilizes electromagnetic radiation.

12. A method according to claim 10 wherein said radiation-initiated reaction utilizes γ-ray or UV radiation.

13. A method according to claim 10 wherein said radiation-initiated reaction utilizes radiation selected from the group consisting of electron beam, electrical discharge and radio frequency.

14. A method according to claim 7 wherein said polymerizable vinylic siloxane monomer is γ-tris (trimethylsiloxy)silylpropyl methacrylate and wherein said hydrophilic vinylic monomer is N,N-dimethylacrylamide.

* * * * *

US005712327C1

(12) EX PARTE REEXAMINATION CERTIFICATE (7120th)

United States Patent
Chang et al.

(10) Number: US 5,712,327 C1
(45) Certificate Issued: Oct. 27, 2009

(54) SOFT GAS PERMEABLE CONTACT LENS HAVING IMPROVED CLINICAL PERFORMANCE

(75) Inventors: Sing-Hsiung Chang, Danbury, CT (US); Mei-Zyh Chang, Danbury, CT (US)

(73) Assignee: Rembrandt Vision Technologies LP, Bala Cynwyd, PA (US)

Reexamination Request:
No. 90/008,845, Sep. 6, 2007

Reexamination Certificate for:
Patent No.: 5,712,327
Issued: Jan. 27, 1998
Appl. No.: 07/899,217
Filed: Jun. 16, 1992

Related U.S. Application Data

(63) Continuation of application No. 07/551,156, filed on Jul. 11, 1990, now abandoned, which is a continuation-in-part of application No. 07/407,261, filed on Sep. 14, 1989, now abandoned, and a continuation-in-part of application No. 07/381,587, filed on Jul. 18, 1989, now abandoned, and a continuation-in-part of application No. 07/132,174, filed on Dec. 14, 1987, now abandoned, which is a continuation-in-part of application No. 07/001,149, filed on Jan. 7, 1987, now abandoned.

(51) Int. Cl.
*G02B 1/04* (2006.01)

(52) U.S. Cl. ............ 523/107; 264/1.1; 264/2.6; 351/160 R; 351/160 H; 427/2.24; 427/487; 427/496; 427/508; 427/515; 522/99; 524/424; 525/326.5; 525/342; 525/477; 526/262; 526/264; 526/279

(58) Field of Classification Search .................. None
See application file for complete search history.

(56) References Cited

U.S. PATENT DOCUMENTS

| 2,484,487 A | 10/1949 | Caldwell |
| 2,793,223 A | 5/1957 | Merker |
| 2,922,806 A | 1/1960 | Merker |
| 2,922,807 A | 1/1960 | Merker |
| 2,929,829 A | 3/1960 | Morehouse |
| 2,956,044 A | 10/1960 | Merker |
| 2,976,576 A | 3/1961 | Wichterle et al. |
| 3,162,676 A | 12/1964 | Goldberg et al. |
| 3,171,869 A | 3/1965 | Weinberg |
| 3,172,868 A | 3/1965 | Jefferson |
| 3,173,893 A | 3/1965 | Fertig et al. |
| 3,220,960 A | 11/1965 | Wichterle |
| 3,221,083 A | 11/1965 | Crandon |
| 3,228,741 A | 1/1966 | Becker |
| 3,249,461 A | 5/1966 | TeGrotenhuis |
| 3,350,216 A | 10/1967 | McVannel et al. |
| 3,361,858 A | 1/1968 | Wichterle |
| 3,408,429 A | 10/1968 | Wichterle |
| 3,415,917 A | 12/1968 | Watanabe et al. |
| 3,488,111 A | 1/1970 | Isen |
| 3,488,215 A | 1/1970 | Shepard et al. |
| 3,496,254 A | 2/1970 | Wichterle |
| 3,499,862 A | 3/1970 | Wichterle |
| 3,503,942 A | 3/1970 | Seiderman |
| 3,512,183 A | 5/1970 | Sharp et al. |
| 3,514,246 A | 5/1970 | Bianco et al. |
| 3,542,461 A | 11/1970 | Girard et al. |
| 3,542,907 A | 11/1970 | Wichterle |
| 3,548,025 A | 12/1970 | Koerner |
| 3,551,035 A | 12/1970 | Kamath |

(Continued)

FOREIGN PATENT DOCUMENTS

| CN | 1031237 | 2/1989 |
| EP | 0016138 | 6/1979 |
| EP | 0 017 022 | 10/1980 |
| EP | 0030807 | 6/1981 |
| EP | 0 068 800 | 6/1982 |
| EP | 0 108 886 | 5/1984 |
| EP | 0242080 | 10/1987 |
| EP | 0 296 220 | 12/1988 |
| ES | 483206 | 8/1979 |
| FR | 2 155 553 | 4/1973 |
| FR | 91 010 0 119 | 3/1991 |
| GB | 1385677 | 2/1975 |
| GB | 1475605 | 6/1977 |
| GB | 1575694 | 9/1980 |
| GB | 2 097 952 | 11/1982 |
| GB | 2 153 371 | 8/1985 |
| GB | 2180243 | 3/1987 |
| JP | 50-13059 | 2/1975 |
| JP | 50-42861 | 4/1975 |
| JP | 50-111382 | 9/1975 |

(Continued)

OTHER PUBLICATIONS

H. Yasuda and M. Gazicki. "Biomedical applications of plasma polymerization and plasma treatment of polymer surfaces" *Biomaterials*, (1982) vol. 3, No. 1, pp. 68–77.

H. Yasuda and A. Sharma. "Effects of Orientation and Mobility of Polymer Molecules at Surfaces on Contact Angle and Hysteresis." Journal of Polymer Science, (1981) vol. 19, pp. 1285–1291.

Yasuda, H. Plasma Polymerization. Chapter 9.15, "Magnetron Discharge for Plasma Polymerization. Institute for Thin Film Processing Service." Academic Press, Inc. 1985. pp. 319–333.

Yasuda, H. Plasma Polymerization. Chapter 6, "Growth Mechanisms of Plasma Polymerization. Institute for Thin Film Processing Service." Academic Press, Inc. 1985. pp. 79–125.

(Continued)

*Primary Examiner*—Dwayne C Jones

(57) ABSTRACT

A hydrophilic soft gas permeable contact lens having substantially improved clinical performance by the provision of a sufficient higher proportion of hydroxy acrylic units to silicon units in the lens surface layer, as compared to that existing in the lens core, by the surface treatment of the lens, such as by reacting of the lens surface with polyols and base or acid or by radiation treatment of the base lens to graft, deposit or coat thereon hydroxy acrylic units.

U.S. PATENT DOCUMENTS

| | | |
|---|---|---|
| 3,561,911 A | 2/1971 | Fuhr et al. |
| 3,577,516 A | 5/1971 | Gould et al. |
| 3,589,363 A | 6/1971 | Banko |
| 3,619,044 A | 11/1971 | Kamath |
| 3,621,079 A | 11/1971 | Leeds |
| 3,639,524 A | 2/1972 | Seiderman |
| 3,647,736 A | 3/1972 | Ewell |
| 3,652,629 A | 3/1972 | Fort |
| 3,655,602 A | 4/1972 | Sekmakas |
| 3,660,545 A | 5/1972 | Wichterle |
| RE27,401 E | 6/1972 | Wichterle et al. |
| 3,674,901 A | 7/1972 | Shepherd et al. |
| 3,691,263 A | 9/1972 | Stoy et al. |
| 3,695,921 A | 10/1972 | Shepherd et al. |
| 3,699,089 A | 10/1972 | Wichterle |
| 3,700,573 A | 10/1972 | Laizier |
| 3,700,761 A | 10/1972 | O'Driscoll et al. |
| 3,721,657 A | 3/1973 | Seiderman |
| 3,726,716 A | 4/1973 | Athearn et al. |
| 3,728,317 A | 4/1973 | Blank |
| 3,745,042 A | 7/1973 | Lim et al. |
| 3,755,280 A | 8/1973 | Saunders |
| 3,758,448 A | 9/1973 | Stamberger |
| 3,772,235 A | 11/1973 | Stamberger |
| 3,787,380 A | 1/1974 | Stamberger |
| 3,792,028 A | 2/1974 | Seiderman |
| 3,802,912 A | 4/1974 | Otocka |
| 3,803,093 A | 4/1974 | Neefe |
| 3,808,178 A | 4/1974 | Gaylord |
| 3,808,179 A | 4/1974 | Gaylord |
| 3,816,571 A | 6/1974 | O'Driscoll et al. |
| 3,822,089 A | 7/1974 | Wichterle |
| 3,849,238 A | 11/1974 | Gould et al. |
| 3,850,892 A | 11/1974 | Kensington et al. |
| 3,854,982 A | 12/1974 | Aelion et al. |
| 3,862,077 A | 1/1975 | Schulz et al. |
| 3,862,097 A | 1/1975 | Milkovich et al. |
| 3,862,098 A | 1/1975 | Milkovich et al. |
| 3,862,105 A | 1/1975 | Milkovich et al. |
| 3,862,267 A | 1/1975 | Milkovich et al. |
| 3,864,140 A | 2/1975 | Ferrigno |
| 3,869,429 A | 3/1975 | Blades |
| 3,878,175 A | 4/1975 | Steckler |
| 3,879,494 A | 4/1975 | Milkovich et al. |
| 3,880,818 A | 4/1975 | Shen et al. |
| 3,916,033 A | 10/1975 | Merrill |
| 3,919,446 A | 11/1975 | Smarook |
| 3,925,178 A | 12/1975 | Gesser et al. |
| 3,928,255 A | 12/1975 | Milkovich et al. |
| 3,937,679 A | 2/1976 | Bosso et al. |
| 3,937,680 A | 2/1976 | de Carle |
| 3,938,080 A | 2/1976 | Hulme |
| 3,939,000 A | 2/1976 | Arvidson, Jr. et al. |
| 3,943,045 A | 3/1976 | Cordrey et al. |
| 3,944,709 A | 3/1976 | Levy |
| 3,948,871 A | 4/1976 | Butterfield, Jr. et al. |
| 3,950,315 A | 4/1976 | Cleaver |
| 3,951,893 A | 4/1976 | Gander |
| 3,959,102 A | 5/1976 | Wajs et al. |
| 3,959,105 A | 5/1976 | Feneberg et al. |
| 3,966,847 A | 6/1976 | Seiderman |
| 3,967,030 A | 6/1976 | Johnson et al. |
| 3,983,083 A | 9/1976 | Kaetsu et al. |
| 3,989,768 A | 11/1976 | Milkovich et al. |
| 3,992,426 A | 11/1976 | Johnson et al. |
| 3,994,506 A | 11/1976 | Weman |
| 3,996,935 A | 12/1976 | Banko |
| 4,002,169 A | 1/1977 | Cupler, II |
| 4,008,198 A | 2/1977 | Krohberger et al. |
| 4,019,066 A | 4/1977 | Lucas et al. |
| 4,022,754 A | 5/1977 | Howes et al. |
| 4,025,252 A | 5/1977 | Hunke |
| 4,028,327 A | 6/1977 | Golovoy |
| 4,035,316 A | 7/1977 | Yen et al. |
| 4,035,345 A | 7/1977 | Ducloux et al. |
| 4,038,264 A | 7/1977 | Rostoker et al. |
| 4,048,123 A | 9/1977 | Hramchenko et al. |
| 4,054,376 A | 10/1977 | Wareham |
| 4,055,378 A | 10/1977 | Feneberg et al. |
| 4,063,557 A | 12/1977 | Wuchinich et al. |
| 4,067,839 A | 1/1978 | Schultz |
| 4,072,769 A | 2/1978 | Lidel |
| 4,078,564 A | 3/1978 | Spina et al. |
| 4,082,894 A | 4/1978 | Yoshida |
| 4,085,168 A | 4/1978 | Milkovich et al. |
| 4,096,315 A | 6/1978 | Kubacki |
| 4,097,657 A | 6/1978 | Sieglaff et al. |
| 4,099,859 A | 7/1978 | Merrill |
| 4,105,598 A | 8/1978 | Yen et al. |
| 4,111,865 A | 9/1978 | Seefried, Jr. et al. |
| 4,113,088 A | 9/1978 | Binkhorst |
| 4,120,570 A | 10/1978 | Gaylord |
| 4,121,091 A | 10/1978 | Wareham |
| 4,122,942 A * | 10/1978 | Wolfson ..................... 206/5.1 |
| 4,123,308 A | 10/1978 | Nowlin et al. |
| 4,123,403 A | 10/1978 | Warner et al. |
| 4,123,407 A | 10/1978 | Gordon |
| 4,128,318 A | 12/1978 | Sieglaff et al. |
| 4,130,706 A | 12/1978 | Plambeck et al. |
| 4,131,691 A | 12/1978 | Morley et al. |
| 4,136,250 A | 1/1979 | Mueller et al. |
| 4,137,365 A | 1/1979 | Fletcher et al. |
| 4,138,382 A | 2/1979 | Polmanteer |
| 4,139,513 A | 2/1979 | Tanaka et al. |
| 4,139,548 A | 2/1979 | Tanaka et al. |
| 4,139,692 A | 2/1979 | Tanaka et al. |
| 4,140,667 A | 2/1979 | Preston et al. |
| 4,143,017 A | 3/1979 | Tarumi |
| 4,143,949 A | 3/1979 | Chen |
| 4,146,696 A | 3/1979 | Bond et al. |
| 4,152,508 A | 5/1979 | Ellis et al. |
| 4,153,641 A | 5/1979 | Deichert |
| 4,153,643 A | 5/1979 | Preston et al. |
| 4,154,714 A | 5/1979 | Hockemeyer et al. |
| 4,154,895 A | 5/1979 | Ogawa et al. |
| 4,158,089 A | 6/1979 | Loshaek et al. |
| 4,163,092 A | 7/1979 | Steckler |
| 4,173,606 A | 11/1979 | Stoy et al. |
| 4,181,781 A | 1/1980 | Chandalia et al. |
| 4,182,802 A | 1/1980 | Loshaek et al. |
| 4,182,822 A | 1/1980 | Chang |
| 4,185,185 A | 1/1980 | Adlam |
| 4,187,408 A | 2/1980 | Heile |
| 4,189,546 A | 2/1980 | Deichert et al. |
| 4,191,176 A | 3/1980 | Spina et al. |
| 4,195,023 A | 3/1980 | Mulvey et al. |
| 4,197,347 A | 4/1980 | Ogawa et al. |
| 4,202,947 A | 5/1980 | Preston et al. |
| 4,206,518 A | 6/1980 | Jardon et al. |
| 4,208,504 A | 6/1980 | Hockemeyer et al. |
| 4,210,727 A | 7/1980 | Preston et al. |
| 4,214,014 A | 7/1980 | Höfer et al. |
| 4,216,303 A | 8/1980 | Novicky |
| 4,217,038 A | 8/1980 | Letter et al. |
| 4,224,427 A | 9/1980 | Mueller et al. |
| 4,228,269 A | 10/1980 | Loshaek et al. |
| 4,235,985 A | 11/1980 | Tanaka et al. |
| 4,242,500 A | 12/1980 | Franceschini |
| 4,246,389 A | 1/1981 | LeBoeuf |
| 4,248,989 A | 2/1981 | Novicky |
| 4,251,412 A | 2/1981 | Ferrini |

| | | | | | |
|---|---|---|---|---|---|
| 4,253,199 A | 3/1981 | Banko | 4,517,138 A | 5/1985 | Rawlings et al. |
| 4,254,248 A | 3/1981 | Friends et al. | 4,517,139 A | 5/1985 | Rawlings et al. |
| 4,254,509 A | 3/1981 | Tennant | 4,517,140 A | 5/1985 | Rawlings |
| 4,259,467 A | 3/1981 | Keogh et al. | 4,521,546 A | 6/1985 | O'Connor et al. |
| 4,260,725 A | 4/1981 | Keogh et al. | 4,525,563 A | 6/1985 | Shibata et al. |
| 4,261,875 A | 4/1981 | LeBoeuf | 4,529,747 A | 7/1985 | Kato et al. |
| 4,276,402 A | 6/1981 | Chromecek et al. | 4,529,753 A | 7/1985 | Taylor |
| 4,277,582 A | 7/1981 | Mueller et al. | 4,529,785 A | 7/1985 | Ohmori et al. |
| 4,277,595 A | 7/1981 | Deichert et al. | 4,533,397 A | 8/1985 | Wingler et al. |
| 4,286,849 A | 9/1981 | Uchidoi et al. | 4,534,723 A | 8/1985 | Rawlings et al. |
| 4,288,521 A | 9/1981 | Kojima et al. | 4,534,916 A | 8/1985 | Wichterle |
| 4,293,418 A | 10/1981 | Fujii et al. | 4,535,138 A | 8/1985 | Ratkowski et al. |
| 4,300,877 A | 11/1981 | Andersen | 4,536,557 A | 8/1985 | Heyman |
| 4,303,772 A | 12/1981 | Novicky | 4,537,943 A | 8/1985 | Talcott |
| 4,304,895 A | 12/1981 | Loshaek | 4,540,761 A | 9/1985 | Kawamura et al. |
| 4,306,042 A | 12/1981 | Neefe | 4,542,542 A | 9/1985 | Wright |
| 4,310,330 A | 1/1982 | Funaki et al. | 4,543,398 A | 9/1985 | Bany et al. |
| 4,312,575 A | 1/1982 | Peyman et al. | 4,546,123 A | 10/1985 | Schafer et al. |
| 4,314,068 A | 2/1982 | Novicky | 4,547,393 A | 10/1985 | Asai et al. |
| 4,317,788 A | 3/1982 | Imada et al. | 4,550,001 A | 10/1985 | Suminoe et al. |
| 4,320,159 A | 3/1982 | Ogawa | 4,553,975 A | 11/1985 | Su |
| 4,327,203 A | 4/1982 | Deichert et al. | 4,556,998 A | 12/1985 | Siepser |
| 4,328,257 A | 5/1982 | Muehlberger et al. | 4,559,059 A | 12/1985 | Su |
| 4,330,383 A | 5/1982 | Ellis et al. | 4,568,501 A | 2/1986 | Wichterle et al. |
| 4,337,859 A | 7/1982 | Murphy et al. | 4,569,858 A | 2/1986 | Lim et al. |
| 4,341,889 A | 7/1982 | Deichert et al. | 4,573,998 A | 3/1986 | Mazzocco |
| 4,342,927 A | 8/1982 | Hull | 4,582,884 A | 4/1986 | Ratkowski |
| 4,343,927 A | 8/1982 | Chang | 4,584,148 A | 4/1986 | Rawlings et al. |
| 4,355,147 A | 10/1982 | Deichert et al. | 4,587,306 A | 5/1986 | Vio et al. |
| 4,361,689 A | 11/1982 | Patel et al. | 4,594,401 A | 6/1986 | Takahashi et al. |
| 4,365,050 A | 12/1982 | Ivani | 4,596,858 A | 6/1986 | Gregor et al. |
| 4,365,074 A | 12/1982 | Novicky | 4,602,074 A | 7/1986 | Mizutani et al. |
| 4,373,218 A | 2/1983 | Schachar | 4,604,479 A | 8/1986 | Ellis |
| 4,375,529 A | 3/1983 | Fong | 4,605,712 A | 8/1986 | Mueller et al. |
| 4,379,864 A | 4/1983 | Gallop et al. | 4,615,703 A | 10/1986 | Callahan et al. |
| 4,390,676 A | 6/1983 | Loshaek | 4,618,557 A | 10/1986 | Dan et al. |
| 4,395,496 A | 7/1983 | Wittmann et al. | 4,625,007 A | 11/1986 | Ellis et al. |
| RE31,406 E | 10/1983 | Gaylord | 4,632,844 A | 12/1986 | Yanagihara et al. |
| RE31,422 E | 10/1983 | Loshaek et al. | 4,632,968 A | 12/1986 | Yokota et al. |
| 4,409,258 A | 10/1983 | Feurer et al. | 4,636,212 A | 1/1987 | Posin et al. |
| 4,414,063 A | 11/1983 | Smiley | 4,638,056 A | 1/1987 | Callahan et al. |
| 4,414,200 A | 11/1983 | Murphy et al. | 4,640,940 A | 2/1987 | Jacobine et al. |
| 4,414,375 A | 11/1983 | Neefe | 4,640,941 A | 2/1987 | Park et al. |
| 4,419,505 A | 12/1983 | Ratkowski et al. | 4,642,267 A | 2/1987 | Creasy et al. |
| 4,420,499 A | 12/1983 | Bolgiano et al. | 4,645,811 A | 2/1987 | Falcetta et al. |
| 4,424,328 A | 1/1984 | Ellis | 4,647,261 A | 3/1987 | Schaffner |
| 4,425,094 A | 1/1984 | Tateosian et al. | 4,649,184 A | 3/1987 | Yoshikawa et al. |
| 4,426,328 A | 1/1984 | Adam et al. | 4,652,470 A | 3/1987 | Das et al. |
| 4,426,389 A | 1/1984 | Stirling et al. | 4,652,622 A | 3/1987 | Friends et al. |
| 4,433,125 A | 2/1984 | Ichinoche et al. | 4,654,419 A | 3/1987 | Vaughan et al. |
| 4,447,562 A | 5/1984 | Ivani | 4,661,573 A | 4/1987 | Ratkowski et al. |
| 4,450,264 A | 5/1984 | Cho | 4,666,977 A | 5/1987 | Kihara et al. |
| 4,451,000 A | 5/1984 | Stephens | 4,668,446 A | 5/1987 | Kaplan et al. |
| 4,451,630 A | 5/1984 | Atkinson et al. | 4,673,621 A | 6/1987 | Fujiki et al. |
| 4,451,635 A | 5/1984 | Gould et al. | 4,677,004 A | 6/1987 | Das et al. |
| 4,457,905 A | 7/1984 | Ebner | 4,680,204 A | 7/1987 | Das et al. |
| 4,458,050 A | 7/1984 | Heyman | 4,683,258 A | 7/1987 | Itoh et al. |
| 4,463,149 A | 7/1984 | Ellis | 4,684,538 A | 8/1987 | Klemarczyk |
| 4,466,705 A | 8/1984 | Michelson | 4,686,267 A | 8/1987 | Ellis et al. |
| 4,468,184 A | 8/1984 | Rawlings | RE32,497 E | 9/1987 | Canfield |
| 4,468,229 A | 8/1984 | Su | 4,690,993 A | 9/1987 | Falcetta et al. |
| 4,478,873 A | 10/1984 | Masso et al. | 4,693,935 A | 9/1987 | Mazurek |
| 4,486,504 A | 12/1984 | Chung | 4,699,934 A | 10/1987 | Ohkado et al. |
| 4,486,577 A | 12/1984 | Mueller et al. | 4,703,097 A | 10/1987 | Wingler et al. |
| 4,487,905 A | 12/1984 | Mitchell | 4,711,943 A | 12/1987 | Harvey, III |
| 4,492,776 A | 1/1985 | Atkinson et al. | 4,725,630 A | 2/1988 | Magee et al. |
| 4,495,361 A | 1/1985 | Friends et al. | 4,728,571 A | 3/1988 | Clemens et al. |
| 4,502,215 A | 3/1985 | Davis et al. | 4,729,892 A | 3/1988 | Beall |
| 4,503,193 A | 3/1985 | Heyman | 4,729,914 A | 3/1988 | Kliment et al. |
| 4,508,216 A | 4/1985 | Kelman | 4,731,079 A | 3/1988 | Stoy |
| 4,508,884 A | 4/1985 | Wittmann et al. | 4,734,475 A | 3/1988 | Goldenberg et al. |

| | | |
|---|---|---|
| 4,735,990 A | 4/1988 | Kihara et al. |
| 4,735,998 A | 4/1988 | Itoh et al. |
| 4,740,282 A | 4/1988 | Gesser et al. |
| 4,740,533 A | 4/1988 | Su et al. |
| 4,743,300 A | 5/1988 | Brinduse et al. |
| 4,743,667 A | 5/1988 | Mizutani et al. |
| 4,743,673 A | 5/1988 | Johnston et al. |
| 4,746,514 A | 5/1988 | Warne |
| 4,753,654 A | 6/1988 | Posin et al. |
| 4,769,431 A | 9/1988 | Ratkowski |
| 4,780,510 A | 10/1988 | Uemiya et al. |
| 4,780,515 A | 10/1988 | Deichert |
| 4,782,946 A | 11/1988 | Pollak |
| 4,803,254 A | 2/1989 | Dunks et al. |
| 4,806,382 A | 2/1989 | Goldberg et al. |
| 4,810,543 A | 3/1989 | Gould |
| 4,810,764 A | 3/1989 | Friends et al. |
| 4,812,173 A | 3/1989 | Tsao et al. |
| 4,814,402 A | 3/1989 | Nakashima et al. |
| 4,820,518 A | 4/1989 | Murphy et al. |
| 4,820,588 A | 4/1989 | Brinduse et al. |
| 4,826,889 A | 5/1989 | Ellis et al. |
| 4,829,137 A | 5/1989 | Stoyan |
| 4,833,218 A | 5/1989 | Lee |
| 4,837,289 A | 6/1989 | Mueller |
| 4,845,180 A | 7/1989 | Henry |
| 4,851,216 A | 7/1989 | Lee |
| 4,855,379 A | 8/1989 | Budnik et al. |
| 4,861,840 A | 8/1989 | Lim et al. |
| 4,861,849 A | 8/1989 | Buchholz |
| 4,892,402 A | 1/1990 | Sawamoto et al. |
| 4,900,366 A | 2/1990 | Sibley et al. |
| 4,910,277 A | 3/1990 | Bambury et al. |
| 4,919,659 A | 4/1990 | Horbett et al. |
| 4,920,184 A | 4/1990 | Schafer et al. |
| 4,929,717 A | 5/1990 | Chmelir |
| 4,933,406 A | 6/1990 | Anan et al. |
| 4,946,903 A | 8/1990 | Gardella, Jr. et al. |
| 4,954,586 A | 9/1990 | Toyoshima et al. |
| 4,954,587 A | 9/1990 | Mueller |
| 4,961,954 A | 10/1990 | Goldberg et al. |
| 4,968,532 A | 11/1990 | Janssen et al. |
| RE33,477 E | 12/1990 | Loshaek |
| 4,977,229 A | 12/1990 | Culberson et al. |
| 4,980,208 A | 12/1990 | Sugiyama et al. |
| 4,983,702 A | 1/1991 | Mueller |
| 5,002,979 A | 3/1991 | Stoyan |
| 5,011,275 A | 4/1991 | Mueller |
| 5,023,305 A | 6/1991 | Onozuka et al. |
| 5,070,215 A | 12/1991 | Bambury et al. |
| 5,080,924 A | 1/1992 | Kamel et al. |
| 5,177,165 A | 1/1993 | Valint, Jr. et al. |
| 5,258,490 A | 11/1993 | Chang |
| 5,326,584 A | 7/1994 | Kamel et al. |
| 5,512,329 A | 4/1996 | Guire et al. |
| 5,578,079 A | 11/1996 | Kamel et al. |
| 5,708,050 A | 1/1998 | Nakada et al. |
| 5,712,327 A | 1/1998 | Chang et al. |
| 5,760,100 A | 6/1998 | Nicolson et al. |
| 5,776,999 A | 7/1998 | Nicolson et al. |
| 5,789,461 A | 8/1998 | Nicolson et al. |
| 5,849,811 A | 12/1998 | Nicolson et al. |
| 5,874,127 A | 2/1999 | Winterton et al. |
| D412,340 S | 7/1999 | Conway |
| 5,922,249 A | 7/1999 | Ajello et al. |
| 5,922,279 A | 7/1999 | Spooner |
| 5,923,397 A | 7/1999 | Bonafini, Jr. |
| 5,925,317 A | 7/1999 | Rogalskyj et al. |
| 5,926,248 A | 7/1999 | Tucker |
| 5,928,282 A | 7/1999 | Nigam |
| D412,928 S | 8/1999 | Conway |
| D412,929 S | 8/1999 | Brune |
| D413,138 S | 8/1999 | Flanagan |
| D413,349 S | 8/1999 | Simioni et al. |
| 5,935,518 A | 8/1999 | Richard et al. |
| 5,941,887 A | 8/1999 | Steen et al. |
| 5,944,725 A | 8/1999 | Cicenas et al. |
| 5,945,498 A | 8/1999 | Hopken et al. |
| 5,946,465 A | 8/1999 | Chmielewski et al. |
| D413,916 S | 9/1999 | Flanagan |
| 5,964,746 A | 10/1999 | McCary |
| 5,965,631 A | 10/1999 | Nicolson et al. |
| 5,969,076 A | 10/1999 | Lai et al. |
| 5,969,793 A | 10/1999 | Dobner |
| 5,972,249 A | 10/1999 | Wrue et al. |
| 5,972,251 A | 10/1999 | Shannon |
| 5,972,292 A | 10/1999 | DeMeo |
| 5,975,694 A | 11/1999 | Vayntraub |
| 5,976,466 A | 11/1999 | Ratner et al. |
| 5,976,694 A | 11/1999 | Tsai et al. |
| 5,977,527 A | 11/1999 | Preston et al. |
| 5,979,494 A | 11/1999 | Perkins et al. |
| 5,981,669 A | 11/1999 | Valint, Jr. et al. |
| 6,043,328 A | 3/2000 | Domschke et al. |
| 6,193,369 B1 | 2/2001 | Valint, Jr. et al. |
| 6,200,626 B1 | 3/2001 | Grobe, III et al. |
| 6,213,604 B1 | 4/2001 | Valint, Jr. et al. |
| 6,428,839 B1 | 8/2002 | Kunzler et al. |
| 6,451,871 B1 | 9/2002 | Winterton et al. |
| 6,881,269 B2 | 4/2005 | Matsuzawa et al. |
| 6,951,894 B1 | 10/2005 | Nicolson et al. |
| 7,078,074 B2 | 7/2006 | Matsuzawa et al. |

FOREIGN PATENT DOCUMENTS

| | | |
|---|---|---|
| JP | 50-111383 | 9/1975 |
| JP | 57-210318 | 12/1982 |
| JP | 59 077 411 | 5/1984 |
| JP | 60-032022 | 2/1985 |
| JP | 60-130714 | 7/1985 |
| JP | 61-087102 | 5/1986 |
| JP | 61-281216 | 12/1986 |
| JP | 63-105015 | 5/1988 |
| JP | 1045877 | 2/1989 |
| JP | 64-045877 | 2/1989 |
| NZ | 237120 | 3/1992 |
| WO | WO 80/00253 | 2/1980 |
| WO | WO84/00968 | 3/1984 |
| WO | WO 86/04341 | 7/1985 |
| WO | WO 88/05060 | 7/1988 |
| WO | WO 89/03297 | 4/1989 |
| WO | WO 91/04283 | 4/1991 |
| WO | WO 91/04288 | 4/1991 |
| WO | WO 92/04283 | 4/1991 |

OTHER PUBLICATIONS

H. Yasuda. Plasma Polymerization. Chapter 10.4, Surface Properties. "Durability of Surface Modification by Plasma Polymerization." Academic Press, Inc. 1985. pp. 345–351.

Alvord, Larry et al. "Oxygen Permeability of a New Type of High Dk Soft Contact Lens Material." Optometry and Vision Science, vol. 75 No. 1 Jan. 1998. American Academy of Optometry. 7 Pages.

Toit, et al. "Recovery from Hyperemia after Overnight Wear of Hydrogel Lenses." Centre for Contact Lens Research, School of Optometry, University of Waterloo, Canada. 1560–B441. 1 Page.

Dumbleton, Kathryn et al. "Changes in Myopic Refractive Error with Nine Months' Extended Wear of Hydrogel Lenses with High and Low oxygen Permeability." Optometry and Vision Science, American Academy of Optometry, 1999. 5 Pages.

Toit et al. "Apparent Sympathetic Response of Contralateral Nonlens wearing eyes after overnight lens wear in the fellow eye." Centre for Contact Lens Research School of Optometry, University of Waterloo, Canada. 1559–B440. 1 Page.

Pritchard, Nicola, et al. "Myopia Associated with Extended Wear of Low–Oxygen–Transmissible hydrogel lenses." Centre for Contact Lens Research, School of Optometry, University of Waterloo, Waterloo Ontario, Canada. Poster # 79, (CL–140). 1 Page.

Dart, John K et al. "Contact lenses and other risk factors in microbial keratitis." The Lancet, vol. 338: Sep. 14, 1991. pp. 640–653.

Fleiszig, Suzanne M.J. et al. "Extended Contact Lens Wear Enhances Pseudomonas Aeruginosa Adherence to Human Corneal Epithelium." Investigative Ophthalmology & Visual Science, vol. 33. No. 10. Sep. 1992. 9 Pages.

Harvitt, Daniel M et al. "Re–Evaluation of the Oxygen Diffusion Model for Predicting Minimum Contact Lens Dk/t Values Needed to Avoid Corneal Anoxia." Optometry and Vision Science, vol. 76, No. 10. American Academy of Optometry, Oct. 1999. 8 Pages.

Holden, Brien A. "Effects of Long–Term Extended Contact Lens Wear on the Human Cornea." vol. 26, Cornea and Contact Lens Research Unit, School of Optometry University of South New Wales, Australia. Submitted for publication: Aug. 8, 1984. pp. 1489–1501.

Holden, Brien A. "Critical Oxygen Levels to Avoid Corneal Edema for Daily and Extended Wear Contact Lenses." Cornea and Contact Lens Research Unit, School of Optometry University of South New Wales, Australia. Submitted for publication: Aug. 9, 1983. pp. 1162–1167.

Myers, Raymond L. and Weiss, Ellen. "Ulcerative Keratitis from Overnight Contact Lens Wear Compared with Other Life Risks." The CLAO Journal, vol. 21, No. 1. Jan. 1995. pp. 31–34.

Nilsson, Erik Sven G, and Montan, Per G. "The Annualized Incidence of Contact Lens Induced Keratitis in Sweden and its Relation to Lens Type and Wear Schedulee: Results of a 3–month Prospective Study." The CLAO Journal, Oct. 1994. 6 Pages.

Patrinely, James et al. "Bacterial Keratitis Associated with Extended Wear Soft Contact Lenses." The CLAO Journal, vol. 11, No. 3, Jul. 1985. 3 Pages.

Sankaridurg, Padmaja R, et al. "Adverse Events with Extended Wear of Disposable Hydrogels." Ophthalmology, vol. 106, No. 9. Sep. 1999. 10 Pages.

Cheng, Lily et al. "Wettability of silicone–hydrogel contact lenses in the presence of tear–film components." Current Eye Research, vol. 28, No. 2. 2004. pp. 93–108.

Adams et al., "Corneal Ulcers in Patients With Cosmetic Extended–Wear Contact Lenses" American Journal of Ophthalmology 96(6):705–709, 1983.

Allen et al., "Photochemistry and Photoinduced Chemical Crosslinking Activity of Type I & II Co–Reactive Photoinitiators in Acrylated Prepolymers" Journal of Photochemistry and Photobiology A: Chemistry 126:135–149, 1999.

Andrade et al., "Probing Polymer Surface and Interface Dynamics," Surface and Interface Anal. 8(6):253–256, 1986.

Batchelor et al., "Radical Addition Rates to Alkenes by Time–Resolved CIDNP: 2–Hydroxy–2–propyl Radicals" J. Phys. Chem. 100:9794–9799, 1996.

Benson, "Continuous Use of Contact Lenses" Aust. J. Ophthalmol. 4:99–103, 1975.

Bhattacharyya et al., "Studies in Addition Polymerization in Mixed Solvent System" Die Makromolekulare Chemie 149(3735):231–241, 1971.

Blackhurst, "Personal Experience with Hydrogel and Silicone Extended Wear Lenses" CLAO Journal 11(2):136–137, 1985.

Bodas et al., "Formation of More Stable Hydrophilic Surfaces of PDMS by Plasma and Chemical Treatments" Microelectronic Engineering 83:1277–1279, 2006.

Chalupa et al., "Severe Corneal Infections Associated with Contact Lens Wear" Ophthalmology 94(1):17–22, 1987.

Chapiro et al., "Polymers With Improved Short Term Hemocompatibility Obtained by Radiation Grafting of N–Vinylpyrrolidone Onto Silicone Rubber" Radiat. Phys. Chem. vol. 15:423–427, 1980.

Chen et al., "Studies of Polymer Surfaces By Sum Frequency Generation Vibrational Spectroscopy" Annu. Rev. Phys. Chem. 53:437–465, 2002.

Clark et al., "Application of ESCA to Polymer Chemistry. VIII. Surface Structures of AB Block Copolymers of Polydimethylsiloxane and Polystyrene" J. Polymer Sci. 14:543–551, 1976.

Covey et al., "Hypoxic Effects on the Anterior Eye of High–Dk Soft Contact Lens Wearers Are Negligible" Optometry and Vision Science 78(2):95–99, 2001.

de Carle, "Developing Hydrophilic Lenses for Continuous Wearing" Aust. J. Optom. 55:343–346, 1972.

Dumbleton et al., "Changes in Myopic Refractive Error with Nine Months' Extended Wear of Hydrogel Lenses with High and Low Oxygen Permeability" Optometry and Vision Science 76(12):845–849.

Dumbleton et al., "Vascular Response to Extended Wear of Hydrogel Lenses with High and Low Oxygen Permeability" Optometry and Vision Science 78(3):147–151, 2001.

Fakes et al., "Surface Modification of a Contact Lens Co–polymer by Plasma–discharge Treatments" Surface and Interface Analysis 10:416–423, 1987.

Fanti, "Silicone Contact Lens Wear III, Physiology of Poor Tolerance" Contact Lens, 6(2):111–119, 1980.

FDA Advisory on Extended Wear Soft Contact Lenses, May 30, 1989.

Fonn et al., "Sympathetic Swelling Response of the Control Eye to Soft Lenses in the Other Eye" Invest. Opthalmol. Vis. Sci. 40(13):3116–3121, 1999.

Friends et al., "Recent Advances in the Design of Polymers for Contact Lenses" Macromol. Symp. 98:619–631, 1995.

Grant et al., "The Clinical Performance of Disposable (58%) Extended Wear Lenses" Trans. Br. Contact Lens Assoc. 63–64, 1988.

Graubner et al., "Wettability and Surface Composition of Poly (Dimethylsiloxane) Irradiated at 172 nm" Polymeric Materials: Science & Engineering 88: 488–489, 2003.

Gregonis et al., "Model Polymers for Probing Surface and Interfacial Phenomena" pp. 43–75.

Gurland, "Use of Silicone Lenses in Infants and Children" Opthalmology 86(9):1599–1604, 1979.

Ho et al., "Ultrathin Coating of Plasma Polymer of Methane Applied on the Surface of Silicone Contact Lenses," Journal of Biomedical Materials Research 22:919–937, 1988.

Holden et al., "Critical Oxygen Levels to Avoid Corneal Edema for Daily and Extended Wear Contact Lenses" Invest. Ophthalmol. Vis. Sci. 25:1161–1167, 1984.

Holden et al., "Effects of Long-Term Extended Contact Lens Wear on the Human Cornea" Invest. Ophthalmol. Vis. Sci. 26:1489–1501, 1985.

Hollahan et al., "Hydroxylation of Polymethylsiloxane Surfaces by Oxidizing Plasmas" Journal of Applied Polymer Science 14:2499–2508, 1970.

http://www.accessdata.fda.gov/scripts/cdrh/cfdocs/cfPMA/PMA.cfm?ID=1696, "Premarket Approval (PMA) for Pure Vision Visibility Tinted Contact Lens for Extended Wear," accessed on Jan. 7, 2009, 2 pages.

http://www.accessdata.fda.gov/scripts/cdrh/cfdocs/cfPMA/PMA.cfm.?ID=12069, "Premarket Approval (PMA) for O2 Optix (Lotrafilcon B) and Night and Day (Lotrafilcon A) Soft Contact Lenses for Extended Wear," accessed on Jan. 12, 2009, 2 pages.

http://www.accessdata.fda.gov/scripts/cdrh/cfdocs/cfPMN/pmn.cfm?ID=110543, "510(k) Premarket Notification Database—SEE3 (Lotrafilcon A) Soft Contact Lens," accessed on Jan. 7, 2009, 1 page.

http://www.ama-assn.org/ama/pub/category/17188.html, "Contact Lenses," accessed on Sep. 14, 2007, 2 pages.

http://www.casa-vision.com/article.asp?articleid=66, "Creating a Silicone Hydrogel Contact Lens," accessed on Jan. 12, 2009, 3 pages.

http://www.cibavision.com/about_worldwide/milestones.shtml, "Milestones," accessed on Jan. 15, 2009, 6 pages.

http://www.contactlensspectrum.com/article.aspx?article=12877, "Experts Advise Caution in Abandoning Hydrogel Lenses," accessed on Feb. 27, 2009, 3 pages.

http://www.optometric.com/article.aspx?article=71701, "No Hard Sell Required," accessed on Feb. 27, 2009, 3 pages.

http://www.prfree.com/index.php?cur=index&action=preview&id=70454, "Silicone Hydrogel Lenses: Online Contact Lens Retailer, Contact Lens King, Informing the Public," accessed Jan. 15, 2009, 2 pages.

Hurrell et al., "The Use of Three Dye-Binding Procedures for the Assessment of Heat Damage to Food Proteins" Br. J. Nutr. 33: 101–115, 1975.

Jalbert et al., "Changes in Myopia with Low-Dk Hydrogel and High-Dk Silicone Hydrogel Extended Wear" Optom. Vis. Sci. 81(8):591–596, 2004.

Jockusch et al., "Radical Addition Rate Constants to Acrylates and Oxygen: α-Hydroxy and α-Amino Radicals Produced by Photolysis of Photoinitiators" J. Am. Chem. Soc. 121:3921–3925, 1999.

Karatekin et al., "Time-Resolved EPR: A Novel Method for Studying Living Chains" Macromolecules 31:7992–7995, 1998.

Keay et al., "Microcyst Reponse to High Dk/t Silicone Hydrogel Contact Lenses" Optom. Vis. Sci. 77(11);582–585, 2000.

Kim et al., "Hydrophobicity Loss and Recovery of Silicone HV Insulation" IEEE Transactions on Dielectrics and Electrical Insulation 6(5):695–702, 1999.

La Hood et al., "Overnight Corneal Edema With Hydrogel, Rigid, Gas-Permeable and Silicone Elastomer Contact Lenses" Intl. Contact Lens Clin. 15(5):149–154, 1988.

Leibowitz et al., "Continuous Wear of Hydrophilic Contact Lenses" Arch. Ophthalmol. 89: 306–310, 1973.

Lopez et al., "Substrate Temperature Effects on Film Chemistry in Plasma Deposition of Organics. III. Analysis by Static Secondary Ion Mass Spectrometry" Journal of Polymer Science: Part A: Polymer Chemistry 30:2427–2441, 1992.

Lukas et al., "An XPS Study of the Surface Reorientation of Statistical Methacrylate Copolymers" Journal of Colloid and Interface Science 174:421–427, 1995.

Mannarino et al., "Clinical Fitting Characteristics of Extended Wear Silicone (Silsight) Lenses" CLAO Journal 11(4):339–342, 1985.

Martschke et al., "Rate Constants for the Additioni of 2-Hydroxy-2-Propyl Radicals to Alkenes in Solution Studied by Laser Flash Photolysis" Helvetica Chimica Acta 80:1363–1374, 1997.

Morgan et al., "International Contact Lens Prescribing 2002" Contact Lens Spectrum, pp. 40–43, 2003.

Morgan et al., "International Contact Lens Prescribing in 2004" Contact Lens Spectrum, pp. 34–37, 2005.

Nelson et al., "Silsoft Extended Wear Contact Lenses in Pediatric Aphakia" Ophthalmology 92(11):1529–1531, 1985.

Nilsson, "The Hospitalized Cases of Contact Lens Induced Keratitis in Sweden and their Relation to Lens Type and Wear Schedule: Results of a Three-Year Retrospective Study" CLAO Journal 20(2): 97–101, 1994.

*Principles of Polymerization: Radical Chain Polymerization*, 3d Ed., G. Odian, Ed. New York: John Wiley & Sons, Inc., 1991, pp. 198, 205, 206, 243.

Oldfield et al., "ESR Study of the Plasma Polymerizations of Trimethylsilane and Methane" Plasmas and Polymers 5(3/4)235–253, 2000.

Papas et al., "High-Oxygen-Transmissibility Soft Contact Lenses do not Induce Limbal Hyperaemia" Curr. Eye Res. 16:942–948, 1997.

Rangel et al., "Investigations on the Stability of Plasma Modified Silicone Surfaces" Plasmas and Polymers 9(1) 35–48, 2004.

Ratner, "Graft Copolymer and Block Copolymer Surfaces," in *Surface and Interfacial Aspects of Biomedical Polymers*, J.D. Andrade, ed. New York: Plenum Press, 1985, pp. 373–394.

Refojo, "Contact Lenses, Hydrogels," in *Polymeric Materials Encyclopedia*, vol. 2(C), New York: CRC Press, 1996, pp. 1504–1509.

Rengstorff, "Soft Gas Permeable Lenses: Extended Wear of the Future" Contact Lens Forum, p. 13, 1986.

Research Finds Risk in Lenses Worn Overnight, The Globe and Mail (Canada), Sep. 21, 1989, 2 pages.

Ruben et al., "'Silicone Rubber' Lenses in Aphakia" Br. J. Ophthalmol. 63:471–474, 1979.

Schein et al., "The Relative Risk of Ulcerative Keratitis Among Users of Daily-Wear and Extended-Wear Soft Contact Lenses" N. Engl. J. Med. 321(12):773–778, 1989.

Schwartz, "Contact Lens Update: The Buzz is Back" Optometric Management, pp. 38–44, 1998.

Seidl et al., "New Photocleavable Structures III: Photochemistry and Photophysics of Pyridinoyl and Benzoyl-Based Photoinitiators" Journal of Photochemistry and Photobiology A: Chemistry 180:109–117, 2006.

Sweeney et al., "Silicone Elastomer Lens Wear Induces Less Overnight Corneal Edema than Sleep Without Lens Wear" Current Eye Research 6(12): 1391–1394, 1987.

Tighe, "Silicone Hydrogel Materials—How Do They Work?" in *Silicone Hydrogels: Continuous Wear Contact Lenses*, Sweeney, D., ed., Oxford: Butterworth–Heinemann, 2001, pp. 1–21.

Tighe, "Silicone Hydrogels: Structure, Properties and Behaviour" in *Silicone Hydrogels: The Rebirth of Continuous Wear Contact Lenses*, Sweeney, D., ed., Oxford: Butterworth–Heinemann, 2000, pp. 1–27.

Wang et al., "Synthesis of Anionic Water–Borne Polyurethane with the Covalent Bond of a Reactive Dye" J. Appl. Polym. Sci. 84:797–805, 2002.

Weikart et al., "Evaluation of Plasma Polymer–Coated Contact Lenses by Electrochemical Impedance Spectroscopy" J. Biomed. Mater Res 54:597–607, 2000.

Weissman et al., "Corneal Ulcers Associated with Extended–Wear Soft Contact Lenses" American Journal of Ophthalmology 97:476–481, 1984.

Wong et al., "Q3–06 Eye Care Preview/Contact Lens Market Update" Baird/U.S. Equity Research, pp. 1–12, 2006.

Yasuda "Plasma for Modification of Polymers" in *Plasma Chemistry of Polymers*, M. Shen, ed., New York and Basel: Marcel Dekker, Inc., 1976, pp. 15–52.

Yasuda, *Plasma Polymerization*, New York: Academic Press, 1985, pp. 7–8, 84–85, 101–103, 166–167, 180–181, 334–369.

Zantos et al., "Ocular Changes Associated with Continuous Wear of Contact Lenses" Aust. J. Optom. 61:418–426, 1978.

Seah et al., "Quantitative Electron Spectroscopy of Surfaces: A Standard Data Base for Electron Inelastic Mean Free Paths in Solids," Surface and Interface Analysis, 1(1):2–11, 1979.

Contact Lens Spectrum, "Marking a Milestone in Contact Lenses", Mar. 1996, 4 pages.

Contact Lens Spectrum, "Silicone Hydrogels: The Evolution of a Revolution", Feb. 2006, 6 pages.

U.S. Appl. No. 07/014,756, filed Feb. 1987, Murray et al.

Frisch et al. Journal of American Chemical Society, vol. 74, 4585.

Fertig Article (Journal of Applied Polymer Science), vol. 10, pp. 663–672, 1966.

U.S. Appl. No. 07/132,174, filed Dec. 14, 1987. Abandoned.
U.S. Appl. No. 07/026,836, filed Mar. 17, 1987. Abandoned.
U.S. Appl. No. 07/001,149, filed Jan. 7, 1987. Abandoned.
U.S. Appl. No. 07/381,587, filed Jul. 18, 1989. Abandoned.
U.S. Appl. No. 07/227,302, filed Aug. 2, 1988. Abandoned.
U.S. Appl. No. 07/407,263, filed Sep. 14, 1984. Abandoned.
U.S. Appl. No. 07/407,261, filed Sep. 14, 1989. Abandoned.
U.S. Appl. No. 07/544,934, filed Jun. 28, 1990.
U.S. Appl. No. 07/551,156, filed Jul. 11, 1990.

Prosecution history of U.S. Appl. No. 06/753,423, filed Jul. 10, 1985. Abandoned.
Prosecution history for U.S. Appl. No. 06/678,754, filed Dec. 5, 1984. Abandoned.
U.S. Appl. No. 06/077,393, filed Sep. 20, 1979.
U.S. Appl. No. 06/104,355, filed Dec. 14, 1979. Abandoned.
U.S. Appl. No. 06/427,845, filed Sep. 29, 1982. Abandoned.
U.S. Appl. No. 06/482,716, filed Apr. 7, 1983. Abandoned.
U.S. Appl. No. 06/559,687, filed Dec. 9, 1983. Abandoned.
AA–Cataract (Apr. 1984), pp. 18–19, Phema.

Patent Family Searchy for US 5,712,327 and US 5,258,490. Library Services Fish & Richardson P.C. Date of Search: Mar. 13, 2008.

Patent Family Search for US 4,343,927 and US 4,182,822. Library Services Fish & Richardson P.C. Date of Search: Mar. 13, 2008.

Calabria, G.A., "Further Experience With Sutureless Scleral Buckling Materials," *Archives of Ophthalmology*, Jul. 1971, vol. 86, pp. 77–81.

Calabria, G.A., et al., "Sutureless Scleral Buckling" *Archives of Ophthalmology*, May 1970, vol. 83, pp. 613–618.

Derwent Abstract 617104/35, JS 2084258–T35, Toyo Contact Lens.

*Journal of American Chemical Society*, "Organic Coatings and Plastics," 37[2]205 and 210 (1977).

*Journal of American Chemical Society*, 74, 4584 (1952).

Ungar, et al. "Electron Resonance Spectra of Polymethyl Methacrylate and Polyethyl Methacrylate." *Journal of Polymer Science* vol. XLIV, pp. 295–302 (1960).

Refojo, M., "Contact Lenses," *Encyclopedia of Polymer Science and Technology*, Supplement vol. I, pp. 195–219.

Refojo, M.F., "Contact Lens Materials," *International Ophthalmology Clinics*, Spring 1973, vol. 13, No. 1, pp. 263–277.

Refojo, M.F., "Contact Lenses," *Encyclopedia of Chemical Technology*, vol. 6, Third Edition, pp. 720–742.

Refojo, M.F., "Experimental Scleral Buckling With A Soft Xerogel Implant," *Ophthalmic Surgery*, Dec. 1978, vol. 9, No. 6, pp. 43–50.

Ruben, M., *Soft Contact Lenses: Clinical And Applied Technology*, Published by John Wiley & Sons, Chapter 3, pp. 19–38.

Shur, Y.J., et al., Gas Permeation of Polymer Blends. V. Compatibility Studies of Poly(vinly Chloride)/Poly–e–caprolactone Blends, *J. Macromol Sci–Phys.* B14, pp. 565–572 (1977).

Yasuda et al., Chemical Abstracts. vol. 70, No. 8, (Feb. 24, 1969), p. 29488W.

* cited by examiner

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–4, 6–8, 10, 11, 13 and 14 is confirmed.

Claims 5, 9 and 12 were not reexamined.

\* \* \* \* \*